US008510553B2

(12) United States Patent
Adrangi et al.

(10) Patent No.: US 8,510,553 B2
(45) Date of Patent: Aug. 13, 2013

(54) SECURE CREDENTIAL MANAGEMENT

(75) Inventors: Farid Adrangi, Lake Oswego, OR (US); Ranjit Narjala, Portland, OR (US); Hani Elgebaly, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1320 days.

(21) Appl. No.: 11/823,985

(22) Filed: Jun. 29, 2007

(65) Prior Publication Data
US 2009/0006848 A1    Jan. 1, 2009

(51) Int. Cl.
*H04L 29/06* (2006.01)

(52) U.S. Cl.
USPC ............ 713/168; 726/2; 726/3; 726/4; 726/5; 726/6; 726/7; 726/9

(58) Field of Classification Search
USPC ................. 713/168; 726/2, 3, 4, 5, 6, 7, 9
See application file for complete search history.

(56) References Cited

U.S. PATENT DOCUMENTS

| | | | | |
|---|---|---|---|---|
| 5,991,410 A * | 11/1999 | Albert et al. | ..................... | 705/78 |
| 6,934,532 B2 * | 8/2005 | Coppinger et al. | ........ | 455/412.1 |
| 2002/0030579 A1 * | 3/2002 | Albert et al. | ..................... | 340/5.9 |
| 2002/0120852 A1 * | 8/2002 | Krishnan et al. | .............. | 713/185 |
| 2002/0135584 A1 * | 9/2002 | Lee | .................................. | 345/531 |
| 2003/0227281 A1 * | 12/2003 | Nguyen | ........................ | 323/282 |
| 2004/0162105 A1 * | 8/2004 | Reddy et al. | .................. | 455/551 |
| 2005/0070262 A1 * | 3/2005 | Weigand | ........................ | 455/418 |
| 2006/0193295 A1 * | 8/2006 | White et al. | .................. | 370/336 |
| 2007/0061244 A1 * | 3/2007 | Ramer et al. | .................... | 705/37 |
| 2007/0255838 A1 * | 11/2007 | Hassan et al. | ................. | 709/227 |

FOREIGN PATENT DOCUMENTS
EP         1081895 A1  *  3/2001

* cited by examiner

*Primary Examiner* — Edan Orgad
*Assistant Examiner* — Bradley Holder
(74) *Attorney, Agent, or Firm* — Kacvinsky Daisak PLLC

(57) ABSTRACT

Apparatus and methods associated with providing secure credential management are described. One apparatus embodiment includes a data store to store authentication data and an authentication supplicant (AS) logic to provide a response to an authentication communication (ACM) received from an authentication process. An authentication management (AM) logic may receive the ACM from a connection management (CM) logic associated with a host operating system (HOS), provide the ACM to the AS logic, and provide the response back to the CM logic. The apparatus may include a device management (DM) client logic to provide a secure connection to an operator DM server associated with the authentication process and to store authentication data provided by the operator DM server in the data store. The AS logic, AM logic, and DM logic may reside in firmware that is not accessible to the HOS.

11 Claims, 4 Drawing Sheets

SECURE CREDENTIAL MANAGEMENT

BACKGROUND

Computers may have multiple connectivity options. For example, a wireless mobile computer (e.g., laptop) may have multiple wireless connectivity options including WLAN (wireless local area network), WWAN (wireless wide area network) (e.g., HSDPA (high speed downlink packet access)), WiMAX (Worldwide Interoperability for Microwave Access), and so on. The options may provide connectivity between a computer and a network. For example, connectivity may be established between a link layer on a wireless laptop and an access point (AP) for a network.

Conventional approaches for supporting multiple connectivity may have experienced issues associated with supporting multiple and different hardware components and/or software elements (e.g., application, driver) for different types of credentials and connectivity. For example, with SIM (Subscriber Identity Module) authentication, a platform may have experienced costs associated with a SIM, a SIM reader, and host software for credential management. If a credential was stored on a network module (e.g., WiMAX card), the costs may have included additional FLASH memory, additional processing logic, and additional executable instructions for credential management. The costs may be related to memory for storing and logic for processing an ICCID (international circuit card identifier) to uniquely identify a SIM, logic for processing an IMSI (International Mobile Subscriber Identity) stored on an operator network, memory for storing and logic for processing a Ki (authentication Key) to authenticate a SIM on a mobile network, and so on. Conventional approaches may also have experienced issues with security since mobile (e.g., wireless) platforms may be open platforms towards which the unscrupulous have turned their attention.

BRIEF DESCRIPTION OF THE DRAWINGS

The accompanying drawings, which are incorporated in and constitute a part of the specification, illustrate various example systems, methods, and other embodiments of various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements, multiple elements may be designed as one element, an element shown as an internal component of another element may be implemented as an external component and vice versa, and so on.

DETAILED DESCRIPTION

Figure 1:
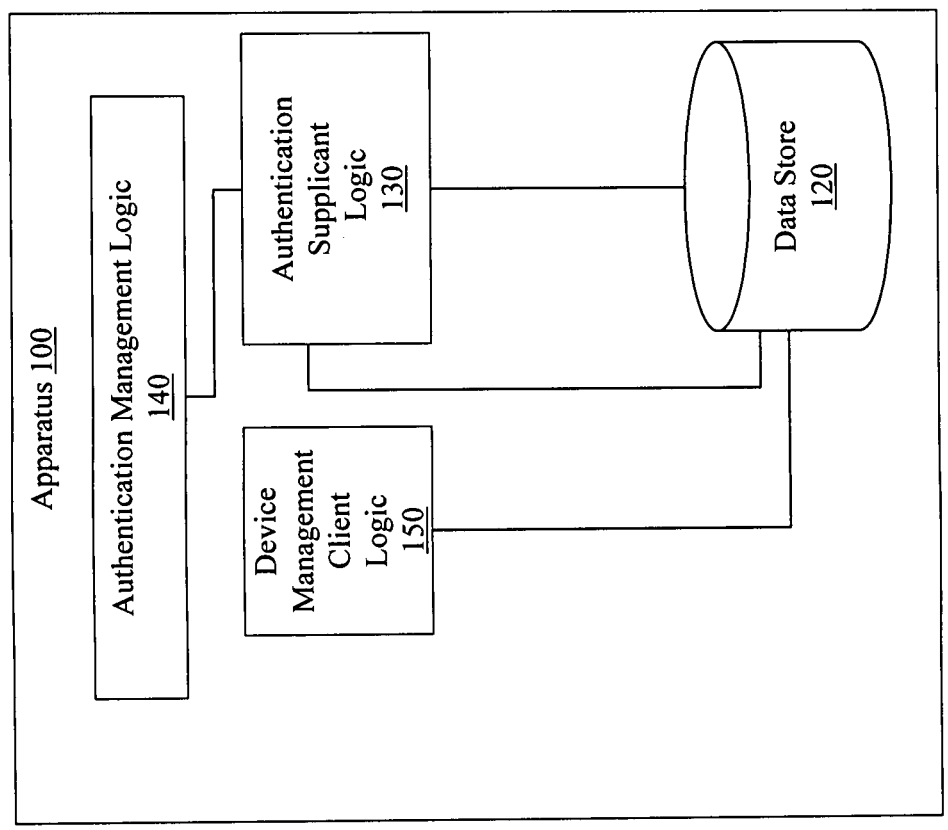
FIG. 1 illustrates an example apparatus associated with secure credential management (SCM).

Example apparatus and methods provide secure credential management (SCM). In one example, this SCM facilitates providing always-on, secure connectivity over multiple and different wireless technologies for computing platforms. In one example, multiple different wireless connectivity options may be provided substantially simultaneously for a wireless computing platform (e.g., laptop). In one example, a tamper resistant apparatus for processing security software (e.g., authentication modules, cryptographic modules) is provided. The tamper resistance may be achieved by moving certain data and/or executable logic into firmware associated with a manageability engine (ME). The ME may be a component located on the chipset in the computing platform and may be powered separately from other elements (e.g., central processing unit (CPU)) in a computing platform and may have access to its memory and executable instructions restricted. This data and executable logic may therefore become less accessible to unauthorized access.

In one example, authentication related modules moved to the ME may include EAP (Extensible Authentication Protocol) modules, supplicant algorithms for various protocols, decryption algorithms, and so on. The decryption algorithms may be used, for example, to decrypt a content key and payload provided to the ME. EAP describes a universal authentication framework for wireless networks and point-to-point (P2P) connections. EAP describes a framework, not a mechanism. The framework describes functions and negotiations associated with establishing a desired authentication mechanism. The mechanisms may be referred to as EAP methods. In one example, when EAP is invoked by a network access server (NAS) (e.g., 802.1x enabled NAS device (e.g., 802.11a/b/g wireless access point (WAP))), EAP methods can provide a secure authentication mechanism and negotiate a secure PMK (Pair-wise Master Key) between the client and the NAS. The PMK can then be used for a wireless encryption session. EAP is not a wire protocol, but rather defines message formats. Thus, protocols that use EAP define ways to encapsulate EAP messages within the protocol messages.

In one example, network identities and/or credentials and service identities and/or credentials may be stored in memory whose access is restricted to firmware whose execution is also restricted. The memory may be, for example, FLASH memory. In one example, logic for processing the information stored in the FLASH memory may be embedded in silicon as firmware. Thus, one example apparatus provides a silicon-based initiative that provides an embedded SIM. This may simplify platform architecture development for platform providers. In one example, device management (DM) protocols may be supported by a host operating system (HOS) while DM clients may be supported by the ME for credential provisioning. Thus, an operator may securely provision credentials using a DM client running in the ME.

Supporting multiple connectivity options may include supporting multiple credentials, multiple credentialing procedures, multiple authentication methods, and so on. This support may facilitate being authenticated to a network and obtaining IP (internet protocol) connectivity. Credentialing may include managing identities and credentials. In some conventional examples this type of information and/or logic for processing the information may have been stored on a computer memory device (e.g., hard drive). In another conventional example, this type of information and/or logic for processing the information may have been stored on a connectivity device (e.g., modem, WiMAX card, SIM). For example, conventional SIM cards may store a service-subscriber key used to identify a mobile phone. However, having data and logic on the SIM card and/or on open platform hardware may make the card and/or the platform vulnerable to unauthorized access. Thus, one example apparatus moves this data and logic to an ME having secure memory and secure firmware that may be separately powered.

The following includes definitions of selected terms employed herein. The definitions include various examples and/or forms of components that fall within the scope of a term and that may be used for implementation. The examples are not intended to be limiting.

"Data store", as used herein, refers to a physical entity that can store data. A data store may be, for example, a memory, a register, a disk, and so on. In different examples a data store may reside in one logical and/or physical entity and/or may be distributed between multiple logical and/or physical entities.

"FLASH memory", as used herein, refers to non-volatile computer memory that can be erased and/or reprogrammed. FLASH memory is a type of EEPROM (Electrically Erasable Programmable Read Only Memory) that can be erased and programmed in large blocks.

"Logic", as used herein, includes but is not limited to hardware, firmware, software in execution, and/or combinations thereof to perform a function(s) or an action(s), and/or to cause a function or action from another logic, method, and/or system. Logic may include discrete logic (e.g., application specific integrated circuit (ASIC)), an analog circuit, a digital circuit, a programmed logic device, and so on. Logic may include a gate(s), a combinations of gates, other circuit components, and so on.

References to "one embodiment", "an embodiment", "one example", "an example", and so on, indicate that the embodiment(s) or example(s) so described may include a particular feature, structure, characteristic, property, element, or limitation. Not every embodiment or example necessarily includes that particular feature, structure, characteristic, property, element or limitation.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software).

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. It is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

FIG. 1 illustrates an apparatus 100. Apparatus 100 includes a data store 120 to store an authentication data associated with a connectivity authentication process (CAP). The authentication data may include, for example, a network identity data, a service identity data, a password, a key, a shared key, a certificate, a credential, and so on. Data store 120 may be, for example, FLASH memory. In one example, access to data store 120 is controlled by a firmware based ME and therefore is not directly accessible to the HOS.

Apparatus 100 may also include an authentication supplicant (AS) logic 130 to provide a response to an authentication communication (ACM). In one example, the ACM may be associated with an EAP method. The EAP method may be, for example, an EAP for GSM (Global System for Mobile communications) Subscriber Identity (EAP-SIM) method, an EAP for UMTS (Universal Mobile Telecommunications System) Authentication and Key Agreement (EAP-AKA) method, and so on.

The AS logic 130 may provide logic that resided in either an operating system, networking interface card, and/or other networking element. In one example, the AS logic is to process an ACM associated with different authentication processes including, EAP, WLAN, WWAN, HSDPA, WiMAX, GSM, and so on. Processing the ACM may include, for example, decrypting the ACM. The AS logic 130 may also encrypt responses provided to the HOS.

Apparatus 100 may also include an authentication management (AM) logic 140 to receive the ACM from a connection management (CM) logic associated with a HOS to which the apparatus 100 is operably connected. (See, FIG. 2). The AM logic 140 is to selectively provide the ACM to the AS logic 130. The AM logic 140 is also to provide the response from the AS logic 130 back to the CM logic. In one example, the AM logic 140 is to communicate ACMs from multiple different authentication processes associated with multiple different networking components and/or protocols. Thus, the AS logic 130 may also process ACMs from multiple different authentication processes.

Apparatus 100 may also include a DM client logic 150 to provide a secure connection to an operator DM server associated with the CAP. The DM client logic 150 may also selectively provide authentication data to a network module associated with the HOS. In one example, the DM client logic 150 receives the authentication data from the operator DM server and selectively stores the authentication data in the data store 120. Additionally, the DM client logic 150 may selectively control a DM agent associated with the HOS to provision a networking module supported by the HOS upon determining that an authentication process has terminated successfully. The provisioning may include, for example, providing selected authentication data stored in the data store 120.

In one example, the AS logic 130, the AM logic 140, and the DM client logic 150 are executable instructions resident in firmware. These firmware resident executable instructions are not executable by the HOS. The firmware may be resident in a micro-controller in a graphics and memory controller hub. The hub may be part of a chipset in a computing platform running the HOS. The firmware in the hub is not accessible to a CPU in the chipset. Similarly, the data store is not accessible to the CPU. In one embodiment, the micro-controller and the CPU have different power sources.

Figure 2:
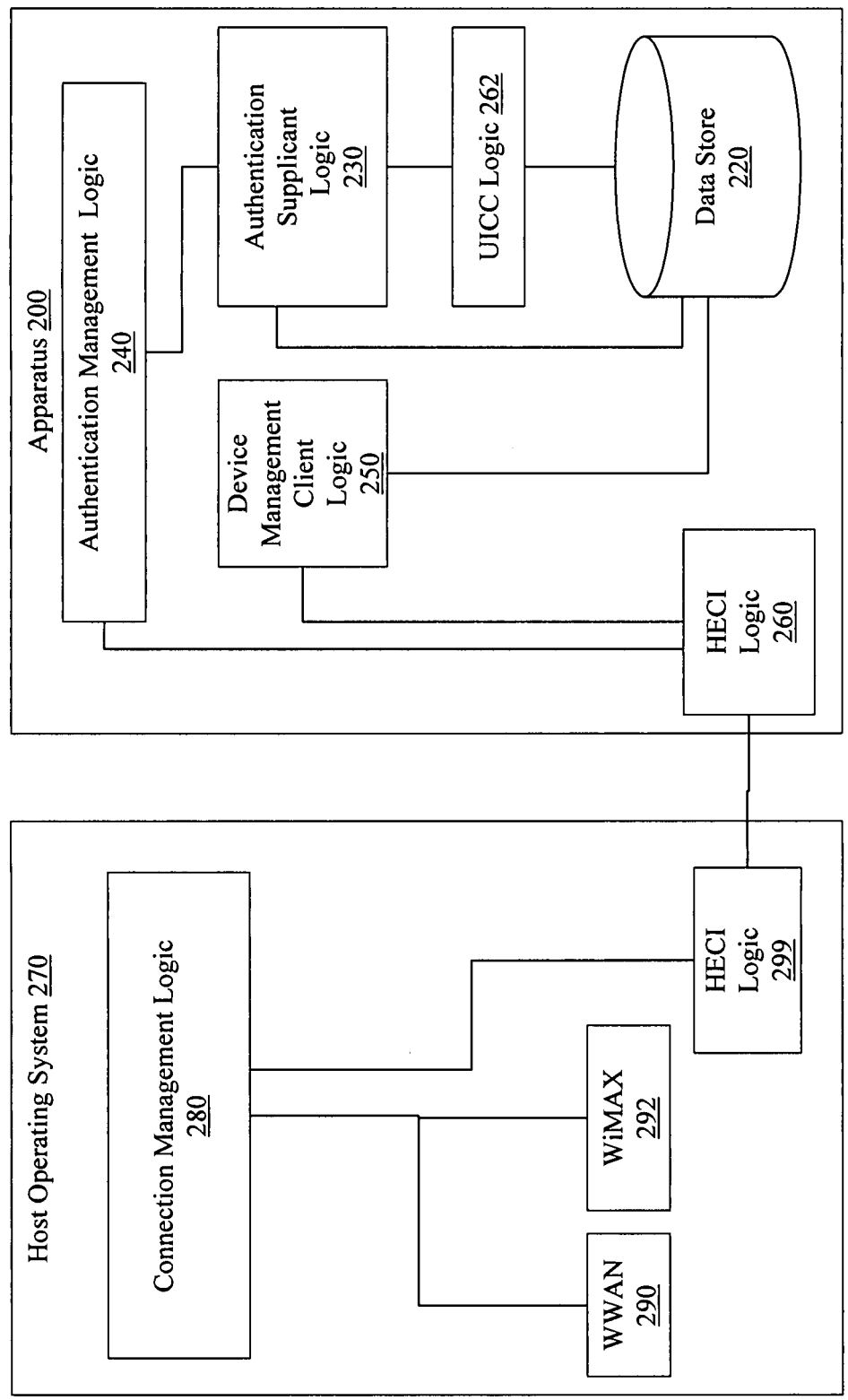
FIG. 2 illustrates an example apparatus associated with SCM.

FIG. 2 illustrates an apparatus 200 that includes some elements similar to those associated with apparatus 100. For example, apparatus 200 includes a data store 220, an AS logic 230, an AM logic 240, and a DM client logic 250. However, apparatus 200 also includes additional elements. For example, apparatus 200 includes a Universal Integrated Circuit Card (UICC) logic 262 to provide a firmware-based virtual SIM. A conventional SIM may hold a key (Ki) assigned by an operator during personalization, may store a signed encrypted value provided by an operator network, and may include logic for computing a signed encrypted value to compare to the provided signed encrypted value. This data and logic may be vulnerable. Thus, in apparatus 200, this data and logic reside in independently powered, restricted access firmware (e.g., ME). While a GSM example is provided, similar approaches may be employed in UMTS, CDMA (Code Division Multiple Access 3G (third generation) telephony), and other examples. In a UMTS example, data and logic associated with a UICC may be relocated while in a CDMA example, data and logic associated with an RUIM (removable user identity module) may be relocated.

Apparatus 200 may also include a host embedded control interface (HECI) logic 260 to provide bidirectional communication between a HOS 270 and apparatus 200. HOS 270 may support a CM logic 280 like that described in connection with FIG. 1. CM logic 280 may proxy communications between an external network authentication logic and apparatus 200. HOS 270 may also support an HECI logic 299 to provide bidirectional communication between the apparatus 200 and the HOS 270. In one example, the HOS 270 is to support a plurality of network communication logics including, for example, a WWAN logic 290 to provide WWAN connectivity, a WiMAX logic 292 to provide WiMAX connectivity, and so on.

Example methods may be better appreciated with reference to flow diagrams. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an example method. In some examples, processing blocks may represent functions and/or actions performed by functionally equivalent circuits (e.g., an analog circuit, a digital signal processor circuit, an ASIC), or other logic device. Blocks may represent executable instructions that cause a computer, processor, logic, and/or device to respond, to perform an action(s), to change states, and/or to make decisions. While the figures illustrate various actions occurring in serial, it is to be appreciated that in some examples various actions could occur concurrently, substantially in parallel, and/or at substantially different points in time.

Figure 3:
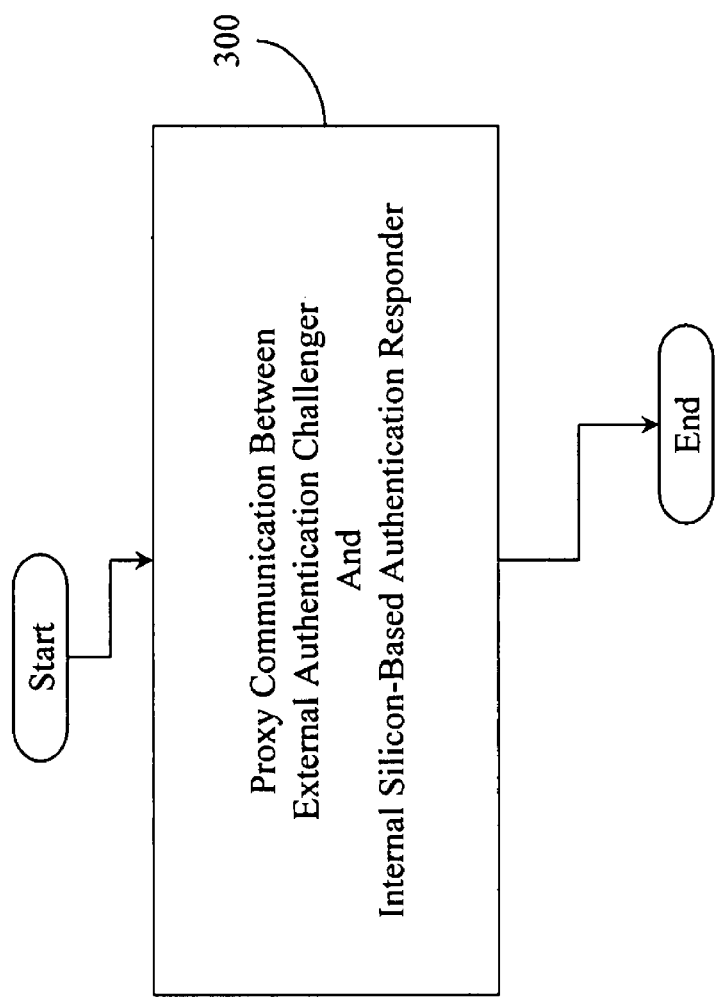
FIG. 3 illustrates an example method associated with SCM.

FIG. 3 illustrates a method 300. Method 300 may proxy communications between an external authentication challenger and an internal silicon-based authentication responder. The external authentication challenger may be, for example, an authentication logic associated with an AP. The internal silicon-based authentication responder may be, for example, logic that has been located in an ME. The authentication logic may send authentication challenges that are received by method 300. In one example, a CM logic associated with a HOS may manage different connections including, for example, a WWAN connection, a WiMAX connection, a WLAN connection, and so on. Thus, authentication challenges may be received over different network components and/or through different network modules. Method 300 may control the CM logic to proxy communications between the AP and the ME regardless of the network component and protocol. To proxy communications means, for example, controlling the CM logic to participate in an authentication process by sending data (e.g., a packet) to an AM logic supported by the ME. The packet may be sent across an HECI that provides bidirectional communications between the HOS and the ME. The ME may then create an encrypted authentication payload (e.g. EAP packet) and provide this payload back to the CM logic through the HECI. Method 300 may then control the CM logic to provide the payload to the challenger over the appropriate network medium, component, and/or protocol. In this example, method 300 controls the CM logic to act as an intermediary (e.g., proxy) between the AM logic in the ME and the network AP.

Method 300 may control the CM logic to continue to act as a proxy and pass information between internal and external logics involved in authentication until the authentication process completes. Upon determining that an authentication process has completed successfully, method 300 may control the ME to securely send session keys to a network module associated with the HOS. In this way, authentication may be performed more securely since the HOS does not participate, except to relay messages. This increases security because the HOS may be a target for unauthorized access.

Figure 4:
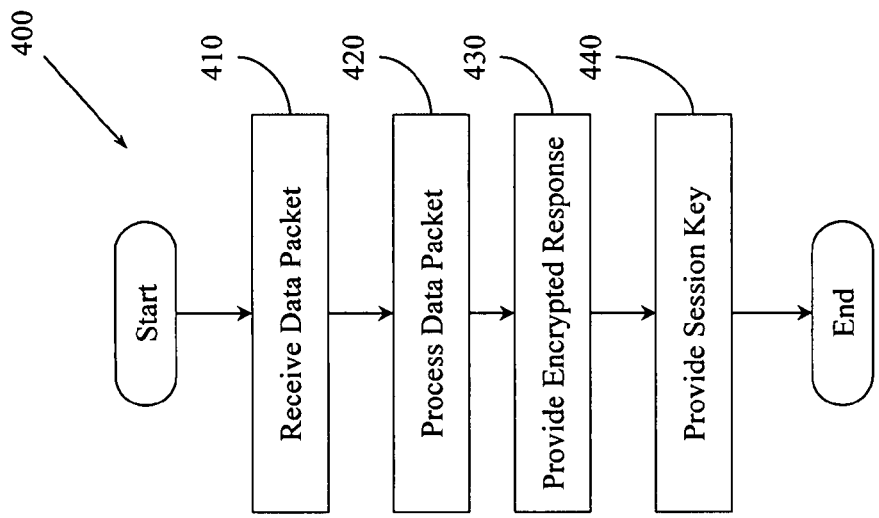
FIG. 4 illustrates an example method associated with SCM.

FIG. 4 illustrates a method 400. Method 400 may include, at 410, receiving a data packet in an internal silicon-based (e.g., ME-based) authentication responder. The data packet may be related to an authentication message received by a HOS. The authentication message may be associated with an authentication process associated with the external authentication challenger.

Method 400 may also include, at 420, selectively processing the data packet. Processing the data packet may include, for example, decrypting the data packet, computing a key, encrypting the key, and providing a response.

Method 400 may also include, at 430, providing a response to the HOS. The response may be encrypted. The response may be a response to the data packet. The HOS is to provide an authentication response to the external authentication challenger and the authentication response may be based on the response.

Method 400 may also include, at 440, providing a session key to the HOS. This session key may be provided upon determining that the external authentication challenger has successfully concluded an authentication process.

While method 400 illustrates various actions occurring in serial, it is to be appreciated that various actions illustrated in FIG. 4 could occur substantially in parallel. By way of illustration, a first process could receive data packets, a second process could process data packets, a third process could provide encrypted responses, and a fourth process could provide a session key. While four processes are described, it is to be appreciated that a greater and/or lesser number of processes could be employed and that lightweight processes, regular processes, threads, and other approaches could be employed.

Method 400 may perform actions 410 through 440 in association with an example SIM authentication process. For example, when a mobile platform (e.g., laptop) starts up, a SIM may send its IMSI to a mobile operator to request access and authentication. An operator network may search its database for the incoming IMSI and related Ki. The operator network may generate a random number (RAND) and sign it with the SIM Ki to produce a signed response (SRES_1). The operator network may then send RAND to the SIM. The SIM may also sign RAND to produce its own signed response (SRES_2) which is then sent to the operator network. The operator network may then compare SRES_1 to SRES_2 to determine whether authentication has been achieved.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. An apparatus, comprising:
   a computer readable storage to store an authentication data associated with a connectivity authentication process (CAP);
   an authentication supplicant (AS) logic to provide a response to an authentication communication (ACM) associated with the CAP;
   an authentication management (AM) logic to receive the ACM from a connection management (CM) logic associated with a host operating system (HOS) to which the apparatus is operably connected, where the AM logic is to selectively provide the ACM to the AS logic, and where the AM logic is to provide the response from the AS logic to the CM logic;
   a Universal Integrated Circuit Card (UICC) logic to provide a firmware-based, independently powered virtual SIM (Subscriber Identity Module) implemented in a secure memory of a manageability engine (ME) to support two or more different authentication processes;
   a device management (DM) client logic to provide a secure connection to an operator DM server associated with the CAP and to selectively provide authentication data to a network module associated with the HOS; and
   a host embedded control interface (HECI) logic to provide bidirectional communication between the HOS and the apparatus where the HOS is to support a connection management (CM) logic to proxy communications between an external network authentication logic and the apparatus, and an HECI logic to provide bidirectional communication between the apparatus and the HOS;
   the AS logic, the AM logic, and the DM client logic being resident in firmware that is not executable by the HOS, the firmware resident in a micro-controller in a controller hub arranged as part of a chipset of a computing platform operative to execute the HOS, wherein the firmware is not accessible to a central processing unit (CPU) of the chipset and the chipset and the micro-controller comprise different power sources.

2. The apparatus of claim 1, the authentication data including one or more of, an identity, a password, a key, a certificate, and a credential.

3. The apparatus of claim 1, the computer readable storage being a FLASH memory to which access is controlled by the firmware based manageability engine (ME), the FLASH memory not being directly accessible by the HOS.

4. The apparatus of claim 1, the ACM being associated with an Extensible Authentication Protocol (EAP) method.

5. The apparatus of claim 4, the EAP method being one or more of, an EAP for GSM (Global System for Mobile Communications) Subscriber Identity (EAP- SIM) method, and an EAP for UMTS (Universal Mobile Telecommunications System) Authentication and Key Agreement (EAP-AKA) method.

6. The apparatus of claim 5, where the AS logic is to process an ACM associated with an EAP authentication process, a WLAN (wireless local area network) authentication process, a WWAN (wireless wide area network) authentication process, a WWAN HSDPA (high speed downlink packet access) authentication process, a WiMAX (Worldwide Interoperability for Microwave Access) authentication process, and a GSM authentication process, where the AS logic is to decrypt the ACM and to encrypt the response.

7. The apparatus of claim 6, where the AM logic is to communicate ACMs from two or more different authentication processes and where the AS logic is to process ACMs from two or more different authentication processes.

8. The apparatus of claim 1, where the DM client logic is to receive the authentication data from the operator DM server, to selectively store the authentication data in the computer readable storage, and to selectively control a DM agent associated with the HOS to provision a networking module supported by the HOS with data selected from authentication data stored in the computer readable storage.

9. The apparatus of claim 1, where the HOS is to support a plurality of network communication logics including one or more of, a wireless wide area network (WWAN) logic to provide WWAN connectivity, and a Worldwide Interoperability for Microwave Access (WiMAX) logic to provide WiMAX connectivity.

10. The apparatus of claim 1, the AS logic, the AM logic, and the DM client logic being resident in a micro-controller in a graphics and memory controller hub, the hub being part of a chipset, the chipset being part of a computing platform on which the HOS is to run, the firmware not being accessible to a central processing unit (CPU) in the chipset, the computer readable storage not being accessible to the CPU, the micro-controller and the CPU to have different power sources.

11. A method, comprising:
   controlling a Universal Integrated Circuit Card (UICC) logic to proxy bidirectional communications between an external authentication challenger and an internal silicon- based authentication responder including a firmware-based, independently powered virtual subscriber identity module (SIM) implemented in a secure memory of a manageability engine (ME) to support two or more different authentication processes;
   receiving in the authentication responder a data packet related to an authentication message received by a host operating system (HOS), the authentication message being associated with an authentication process associated with the external authentication challenger;
   selectively processing the data packet;
   providing an encrypted response to the data packet to the HOS, where the HOS is to provide an authentication response to the external authentication challenger, the authentication response being based, at least in part, on the encrypted response to the data packet; and
   providing a session key to the HOS upon determining that the external authentication challenger has successfully concluded an authentication process;
   wherein the logic is resident in firmware that is not executable by the HOS and is operative on a micro-controller in a controller hub arranged as part of a chipset of a computing platform operative to execute the HOS and wherein the logic is not accessible to a central processing unit (CPU) of the chipset and the chipset and the micro-controller comprise different power sources.

* * * * *